United States Patent
Takeuchi et al.

(10) Patent No.: US 6,228,534 B1
(45) Date of Patent: May 8, 2001

(54) ANNEALING OF MIXED METAL OXIDE ELECTRODES TO REDUCE POLARIZATION RESISTANCE

(75) Inventors: Esther S. Takeuchi, East Amherst; William C. Thiebolt, III, Tonawanda, both of NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/217,215

(22) Filed: Dec. 21, 1998

(51) Int. Cl.[7] .................................................... H01M 4/34
(52) U.S. Cl. ...................... 429/219; 429/220; 429/231.2; 429/231.5; 429/231.95; 429/215; 429/245; 429/212; 29/623.1
(58) Field of Search .............................. 429/231.1, 219, 429/231.2, 220, 224, 223, 221, 245, 215, 231.5, 231.95, 212; 29/623.1

(56) References Cited

U.S. PATENT DOCUMENTS

| | | | |
|---|---|---|---|
| 3,847,674 | * 11/1974 | Kegelman | 429/122 |
| 4,792,505 | 12/1988 | Moyes | 429/219 |
| 5,429,894 | 7/1995 | Leap et al. | 429/219 |
| 5,532,086 | 7/1996 | Thibault et al. | 429/245 |
| 5,543,249 | 8/1996 | Takeuchi et al. | 429/217 |
| 5,580,683 | 12/1996 | Takeuchi et al. | 429/194 |
| 5,639,577 | * 6/1997 | Takeuchi et al. | 429/219 |

* cited by examiner

Primary Examiner—Laura Weiner
(74) Attorney, Agent, or Firm—Hodgson Russ LLP

(57) ABSTRACT

The thermal treatment of transition metal oxide electrodes such as silver vanadium oxide cathode plates, contacted to titanium current collectors for the purpose of reducing polarization resistance in an alkali metal electrochemical cell, is described. The electrodes are exposed to an elevated temperature of at least about 225° C. for about 8 hours prior to cell fabrication. The present heat treatment regime is particularly useful in cathodes intended for fabrication into a cell powering an implantable medical device with improved polarization resistance as well as reduced heat dissipation.

22 Claims, 9 Drawing Sheets

ANNEALING OF MIXED METAL OXIDE ELECTRODES TO REDUCE POLARIZATION RESISTANCE

BACKGROUND OF THE INVENTION

1. Field of the Invention

The present invention generally relates to the conversion of chemical energy to electrical energy, and more particularly, to an alkali metal electrochemical cell having a positive electrode comprising a mixed metal oxide. Preferred mixed metal oxides include silver vanadium oxide, copper vanadium oxide and copper silver vanadium oxide. According to the present invention, electrode plates of mixed metal oxide active material are thermally treated to reduce polarization resistance of cells incorporating the treated plates.

2. Prior Art

It is known in the prior art to heat both anode and cathode electrodes to increase and enhance the bond between the electrode active material and the current collector. Examples of this include U.S. Pat. No. 5,429,894 to Leap et al. which is directed to dehydrating a silver oxide paste contacted to a current collector. Heating takes place under nitrogen at a temperature of about 50° C. to 70° C. The heating protocol serves to enhance the bond between the active material and current collector without reducing the silver oxide to elemental silver.

U.S. Pat. No. 5,532,086 to Thibault et al. teaches increasing the bond between a silver foil current collector layer and a zinc metal anodic layer. Bonding is accomplished by pressing the current collector and the anodic layer between a plate heated to a temperature of about 650° F. (334° C.) to 750° F. (398° C.) and under an anvil pressure of about 1,500 to 5,000 psi.

SUMMARY OF THE INVENTION

The present invention is directed to transition metal oxide active materials that are heated subsequent to contact with a current collector. Electrodes fabricated in this manner are useful in both multiplate and jellyroll cell designs to decrease the electrical resistivity of the completed electrode assemblies. In turn, the discharge efficiency of the cell is increased. Also, heat dissipation of the present invention cells is improved in comparison to untreated cells of a similar electrode chemistry. Reduced heat dissipation is related to the reactivity of the cathode with the electrolyte. Reduced reactivity consequently benefits improved discharge efficiency.

These and other aspects of the present invention will become more apparent to those skilled in the art by reference to the following description and to the appended drawings.

DETAILED DESCRIPTION OF THE PREFERRED EMBODIMENTS

Figure 1:
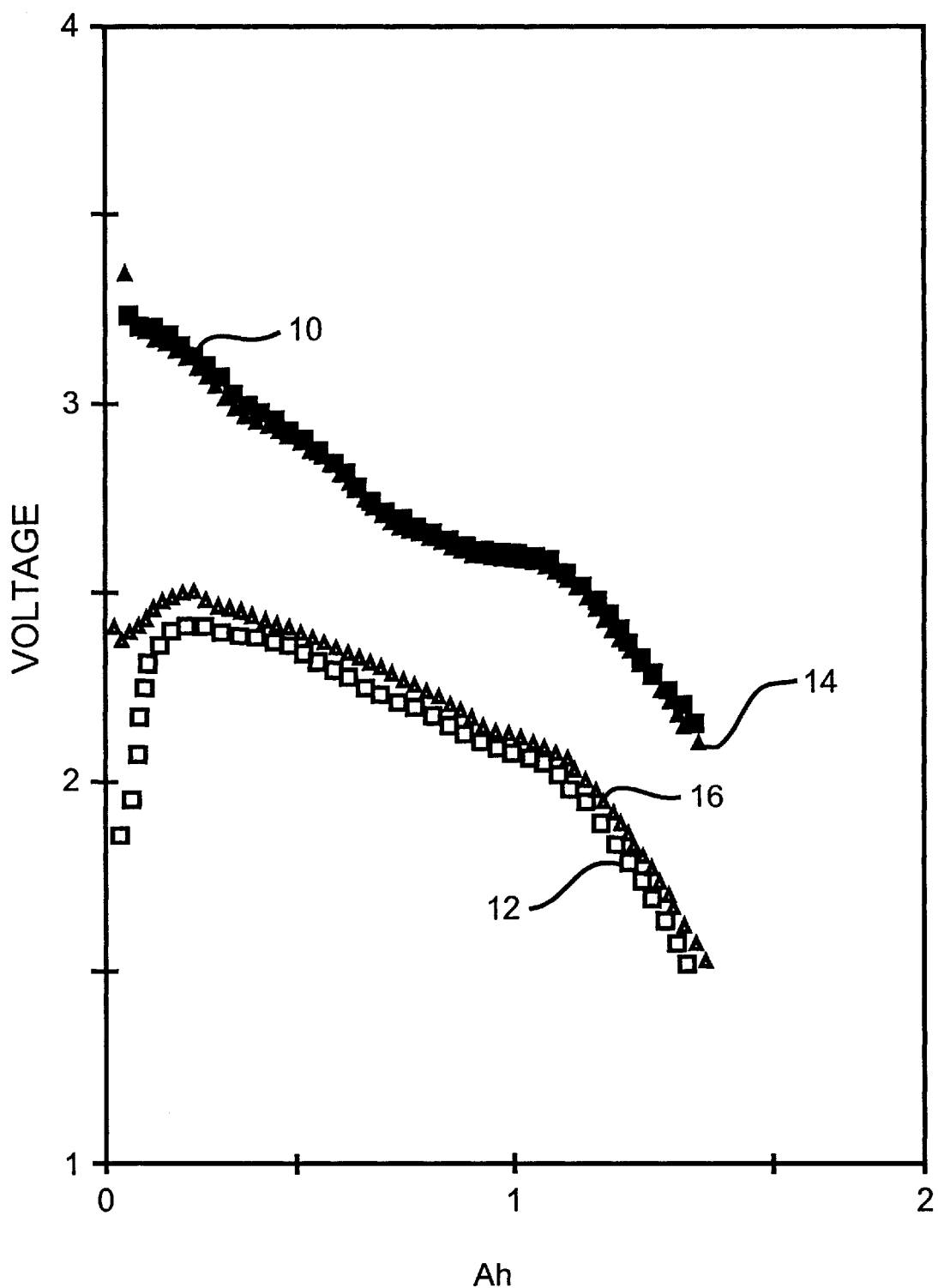
FIG. 1 is a graph of Li/SVO cells discharged to deliver periodic pulse trains and constructed, respectively, according to the prior art and according to the present invention having the cathode plates annealed prior to cell fabrication.

The electrochemical cell of the present invention comprises an anode electrode of a metal selected from Groups IA, IIA or IIIA of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy, such as lithium-aluminum alloy. The greater the amount of aluminum present by weight in the alloy, the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical reaction at the cathode involves conversion into atomic or molecular forms of ions which migrate from the anode to the cathode. The cathode material comprises at least a first cathode active constituent which may be a metal, a metal oxide, or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide.

The metal oxide or the mixed metal oxide can be constructed by the chemical addition, reaction, or otherwise intimate contact of various metal oxides and/or metal elements, preferably during thermal treatment, addition reaction, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII of the Periodic Table of Elements which includes the noble metals and/or other oxide compounds.

The metals or oxides of metals are selected from Groups IB, IIB, IIIB, IVB, VB, VIB, VIIB, as well as from Group VIII are thermally treated so as to effect the rapid preparation of the oxides or the respective metal elements themselves to be utilized further in the preparation of the cathode material. Such readily decomposable materials include, but are not limited to, those classes of compounds known as nitrates, nitrites, carbonates, and/or ammonium salts. The precursor materials (i.e., nitrates, nitrites, carbonates, ammonium compounds, etc.) may be decomposed in a combined state or individually decomposed and, thereafter, combined in an oxide-decomposable metal oxide compound and subsequently decomposed to form a cathode active material comprising a mixed metal oxide.

Preferred mixed metal oxides are prepared by mixing vanadium oxide with a metal or a metal oxide of a second metal and possibly a third metal. This admixture is thereafter reacted to form the mixed metal oxide. The second and third metals are most preferably selected from silver, copper and manganese.

One preferred mixed metal oxide has the general formula $SM_xV_2O_y$ wherein SM is a metal selected from the Groups IB to VIIB and VIII of the Periodic Table of Elements and wherein x is about 0.30 to 2.0 and y is about 4.5 to 6.0 in the general formula. By way of illustration, and in no way intended to be limiting, one exemplary cathode active material comprises silver vanadium oxide (SVO) having the general formula $Ag_xV_2O_y$ in any one of its many phases, i.e., β-phase silver vanadium oxide having in the general formula x=0.35 and y=5.8, γ-phase silver vanadium oxide having in the general formula x=0.74 and y=5.37 and ε-phase silver vanadium oxide having in the general formula x=1.0 and y=5.5, and combination and mixtures of phases thereof. U.S. Pat. No. 4,310,609 to Liang et al., which is assigned to the assignee of the present invention and incorporated herein by reference, describes an alkali metal cell having such a mixed metal oxide cathode active material.

Another preferred composite cathode material prepared from a mixture of vanadium oxide and a second metal or metal oxide and a third metal or metal oxide, preferably comprising silver and copper, according to the present invention includes $V_2O_z$ wherein $z \leq 5$ combined with $Ag_2O_z$ wherein z=2 to 1 and $CuO_z$, wherein z =0 to 1 to provide the mixed metal oxide having the formula $Cu_xAg_yV_2O_z$, (CSVO). Thus, this composite cathode active material may be described as a metal oxide-metal oxide-metal oxide, a metal-metal oxide-metal oxide, or a metal-metal-metal oxide and the range of material composition found for $Cu_xAg_yV_2O_z$, is preferably about $0.01 \leq x \leq 1.0$, about $0.01 \leq y \leq 1.0$ and about $5.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. U.S. Pat. No. 5,472,810 to Takeuchi et al., which is assigned to the assignee of the present invention and incorporated herein by reference, describes an alkali metal cell having a counter electrode comprising such a composite cathode material.

Additional cathode active materials that are useful with the present invention include manganese dioxide, cobalt oxide, nickel oxide, copper oxide, titanium disulfide, copper sulfide, iron sulfide, iron disulfide, copper vanadium oxide, and mixtures thereof.

The above described cathode active materials are formed into an electrode for incorporation into an electrochemical cell by mixing one or more of them with a conductive additive such as acetylene black, carbon black and/or graphite. Metallic powders such as nickel, aluminum, titanium and stainless steel in powder form are also useful as conductive diluents when mixed with the above listed cathode active materials. The cathode electrode further comprises a binder material which is preferably a fluoro-resin powder such as powdered polytetrafluoroethylene (PTFE), powdered polyvinylidene fluoride (PVDF), polyethylenetetrafluoroethylene (ETFE), polyamides and polyimides, and mixtures thereof. More specifically, a preferred cathode active material comprises SVO in any one of its many phases, or mixtures thereof, and/or CSVO mixed with a binder material and a conductive diluent.

A preferred cathode active admixture according to the present invention comprises from about 80% to 99%, by weight, of a cathode active material comprising either one or both of the SVO and CSVO materials mixed with a suitable binder and a conductor diluent. The resulting blended cathode active mixture may be formed into a free-standing sheet prior to being contacted with a current collector to form the cathode electrode. The manner in which the cathode active mixture is prepared into a free-standing sheet is thoroughly described in U.S. Pat. No. 5,435,874 to Takeuchi et al., which is assigned to the assignee of the present invention and incorporated herein by reference.

Further, cathode components for incorporation into a cell according to the present invention may also be prepared by rolling, spreading or pressing the cathode active mixture onto a suitable current collector. Cathodes prepared as described above may be in the form of one or more plates operatively associated with at least one or more plates of anode material, or in the form of a strip wound with a corresponding strip of anode material in a structure similar to a "jellyroll". A preferred material for the current collector is titanium, although stainless steel, nickel, molybdenum, tantalum, niobium, cobalt, tungsten, platinum, palladium, gold, silver, copper, vanadium, aluminum, zirconium, hafnium, zinc and iron, and the like, and mixtures and alloys thereof may also be used.

According to the present invention the prepared cathode active material, which may or may not include binder and conductive additive materials, is contacted to a conductive current collector and then subjected to a prolonged heat treatment or annealing step. The cathode active material is preferably contacted at a pressure of about 8 tons/cm$^2$ to about 120 tons/cm$^2$. The preferred current collector for a SVO active admixture is titanium and the annealing is at a temperature ranging from about 225° C. to about 300° C. for a heating time of about 8 hours to about 16 hours. Such a treatment protocol reduces the resistivity of the completed cathode plate to about 0.2 Ωcm or less.

In order to prevent internal short circuit conditions, the cathode is separated from the Group IA, IIA or IIIA anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions which migrate from the anode to the cathode into atomic or molecular forms. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The ionically conductive salt serves as the vehicle for migration of the anode ions to intercalate or react with the cathode active material. In a solid cathode/electrolyte system, the preferred ion-forming alkali metal salt is similar to the alkali metal comprising the anode. Examples of salts useful with the present invention include $LiPF_6$, $LiAsF_6$, $LiSbF_6$, $LiBF_4$, $LiAlCl_4$, $LiNO_3$, $LiGaCl_4$, $LiSO_3F$, $LiB(C_6H_5)_4$, $LiClO_4$, $LiC(SO_2CF_3)_3$, $LiSCN$, $LiO_3SCF_2CF_3$, $LiC_6F_5SO_3$, $LiO_2CCF_3$, $LiN(SO_2CF_3)_2$ and $LiCF_3SO_3$, and mixtures thereof.

Low viscosity solvents include tetrahydrofuran (THF), methyl acetate (MA), diglyme, trigylme, tetragylme, dimethyl carbonate (DMC), 1,2-dimethoxyethane (DME), diethyl carbonate, diisopropylether, 1,2-diethoxyethane (DEE), 1-ethoxy,2-methoxyethane (EME), dipropyl carbonate (DPC), ethylmethyl carbonate (EMC), methylpropyl carbonate (MPC) and ethylpropyl carbonate (EPC), and mixtures thereof, and high permittivity solvents include cyclic carbonates, cyclic esters and cyclic amides such as propylene carbonate (PC), butylene carbonate (BC), ethylene carbonate (EC), acetonitrile, dimethyl sulfoxide, dimethyl formamide, dimethyl acetamide, γ-valerolactone, γ-butyrolactone (GBL) and N-methyl-pyrrolidinone (NMP) and mixtures thereof. In the preferred electrochemical cell comprising the Li/SVO or the LI/CSVO couple, the preferred electrolyte is 1.0M to 1.4M $LiPF_6$ or $LiAsF_6$ or the Li/CSVO in a 50:50 mixture, by volume, of PC and DME.

The preferred form of the electrochemical cell of the present invention is a case-negative design wherein the anode/cathode couple is provided as a spirally-wound electrode assembly in a jellyroll configuration inserted into a conductive metal casing such that the casing, a header thereof, or both are connected to the anode current collector and serve as the negative cell terminal, as is well known to those skilled in the art. A preferred material for the casing is titanium although stainless steel, nickel and aluminum are also suitable. The casing header has a sufficient number of openings to accommodate a glass-to-metal seal terminal pin feedthrough for the cathode electrode. An additional opening is provided for electrolyte filling. After the spirally-wound electrode assembly is inserted into the casing and the casing header is secured thereto, the cell is filled with the electrolyte solution described hereinabove and hermetically sealed such as by close-welding a stainless steel plug over the fill hole, but not limited thereto. The cell of the present invention can also be constructed in a case-positive design.

The following examples describe the manner and process of manufacturing an electrochemical cell according to the present invention, and they set forth the best mode contemplated by the inventors of carrying out the invention, but they are not to be construed as limiting.

EXAMPLE I

Silver vanadium oxide cathode plates were fabricated by uniaxially pressing a powder mixture of, by weight, 94% SVO, 3% polytetrafluoroethylene, 1% Ketjenblack® carbon and 2% graphite loaded into a steel press form. A pressure of 6.15 tons/cm² was used. Six plates were pressed from the powdered depolarizer mixture having a centrally located titanium screen current collector and six plates were pressed from the powdered depolarizer mixture without the titanium current collector. Three plates with the titanium current collector and three plates without the current collector were heated at 250° C. for about 24 hours (annealed). Resistivity measurements were recorded on ambient temperature plates using a linear four probe technique. Silver paint was used to insure contact of the plates to the probes. Table 1 presents the results of the resistivity measurements.

TABLE 1

|  | resistivity, Ωcm | standard deviation |
|---|---|---|
| SVO powdered depolarizer, no screen | 3.74 | 2.26 |
| SVO powdered depolarizer, annealed 250°, no screen | 10.68 | 2.65 |
| SVO powdered depolarizer, w/screen | 0.011 | 0.006 |
| SVO powdered depolarizer, annealed 250°, w/screen | 0.001 | 0.000 |

As seen in Table 1, thermal treatment of pressed powder plates without current collectors yielded increased resistivity whereas thermal treatment of plates with current collectors yielded decreased resistivity.

EXAMPLE II

Free standing silver vanadium oxide cathode sheets were calendared from an active admixture paste according to the method described in U.S. Pat. No. 5,435,874 to Takeuchi et al., which is assigned to the assignee of the present invention and incorporated herein by reference. The free standing sheets were made by calendaring a paste mixture of, by weight, 94% SVO, 3% polytetrafluoroethylene, 2% Ketjenblack® carbon and 1% graphite. The cathode sheet material was then pressed into plates at a pressure of 6.15 tons/cm². Six plates were pressed having a centrally located titanium screen current collector and six plates were pressed without the titanium current collector. Three plates with the titanium current collector and three plates without the current collector were then heated at 250° C. for about 24 hours (annealed plates). Resistivity measurements were recorded in a similar manner as described in Example I. Table 2 presents the results of the resistivity measurements.

TABLE 2

|  | resistivity, Ωcm | standard deviation |
|---|---|---|
| SVO sheet depolarizer, no screen | 2.60 | 0.18 |
| SVO sheet depolarizer, annealed 250°, no screen | 10.07 | 0.29 |

TABLE 2-continued

|  | resistivity, Ωcm | standard deviation |
|---|---|---|
| SVO sheet depolarizer, w/screen | 0.13 | 0.01 |
| SVO sheet depolarizer, annealed 250°, w/screen | 0.06 | 0.02 |

Again, as seen in Table 2, thermal treatment of pressed free standing plates without current collectors yielded increased resistivity whereas thermal treatment of plates with current collectors yielded decreased resistivity.

EXAMPLE III

Lithium cells were manufactured using SVO cathodes of 7.5 cm² area per plate and 0.042 cm thickness. Plate preparation was as described in Example II and included both annealed and unheated plates. Six cathode plates interleaved between a serpentine anode were welded together to make the cathode assembly for each cell. The cathodes as well as the lithium anodes were each wrapped in one layer of CELGARD 4560 polypropylene separator. The thusly made electrode assemblies were placed in stainless steel cases and hermetically sealed following introduction of an electrolyte comprising 1M LiAsF$_6$ in a 1:1 mixture, by volume, of propylene carbonate/dimethoxyethane.

Three cells from both the annealed and the unheated plate groups were discharged at 37° C. Initially, loads of 2.49 kΩ were placed on the cells for 17 hours. Following one week of open circuit storage, a pulse train consisting of four 10 second 2 A pulses (27 mA/cm²) with 15 seconds rest between each pulse was applied to each cell. Pertinent data from those pulse trains was retrieved for analysis. The prepulse voltage, the minimum voltage during the first pulse of the train (p1 min), the voltage at the end of the first pulse of the train (p1 end), the minimum voltage during the fourth pulse of the train (p4 min) and the voltage delay (V-delay) were examined. Voltage delay is calculated as p1 end minus p1 min potential. The data are presented in the Table 3.

TABLE 3

| Cell Group | prepulse mV | p1 min mV | p1 end mV | p4 min mV | V-delay mV |
|---|---|---|---|---|---|
| control (avg.) | 3248 | 1443 | 1558 | 1691 | 115 |
| std. dev. | 2 | 41 | 39 | 39 |  |
| annealed (avg.) | 3252 | 2156 | 2310 | 2261 | 154 |
| std. dev. | 1 | 29 | 21 | 20 |  |

It can be seen that the pulse voltage minima and the voltage at the end of the first pulse of the train were significantly higher for the cells built from annealed plates.

Subsequent to the above partial discharge, the cells in this example were depleted of their capacities through application of one pulse train each thirty minutes. Again, a pulse train consisted of four 10 second 2 A pulses (27 mA/cm²) with 15 seconds rest between each pulse. The average capacities delivered to 2V, 1.7V and 1.5V are presented in the Table 4.

TABLE 4

| Cell Group | mAh to 2 V | mAh to 1.7 V | mAh to 1.5 V |
|---|---|---|---|
| control (avg.) | 24 | 1334 | 1458 |
| std. dev. | 1 | 21 | 22 |
| annealed (avg.) | 1217 | 1455 | 1561 |
| std. dev. | 29 | 25 | 26 |

From Table 4, it can be seen that the delivered capacities were significantly higher to each cutoff for the cells built from annealed plates. Representative curves of the thusly pulse discharged cells are shown in FIG. 1. In particular, curve 10 was constructed from the open circuit voltage of a representative control cell and curve 12 was constructed from the p4 minima of that cell during pulse discharge. Curve 14 was constructed from the open circuit voltage of a representative present invention cell constructed according to this example and curve 16 was constructed from the p4 minima of that cell during pulse discharge.

The open circuit voltages recorded during discharge were not significantly different between the two groups. Depressed voltages during pulse discharge are especially evident at beginning of life in the discharge curves of the control cells. That phenomenon is not as severe in the cells built having annealed cathode plates according to the present invention. The annealed plate cells also show less polarization throughout discharge, as evidenced by the higher pulse minima curves of FIG. 1 and the higher delivered capacities to the various designated voltage cutoffs.

EXAMPLE IV

Ten Li/SVO cells were manufactured in a multiplate construction similar to that described in Example III. Various ones of the cells had annealed cathode plates and unheated cathode plates.

A constant resistive load of 10.5 kΩ was applied to all six cells for 15 hours during an initial predischarge burn-in period. The predischarge period is referred to as burn-in and depleted the cells of approximately 1% of their theoretical capacity. Following burn-in, the cells were placed on open circuit storage for 7 days and then subjected to acceptance pulse testing consisting of four 10 second 2 A pulses (27 mA/cm²) with a 15 second rest between each pulse. One such train was applied every 39 days. This type of discharge is termed in-house as 10 month accelerated discharge data (ADD).

Figure 2:
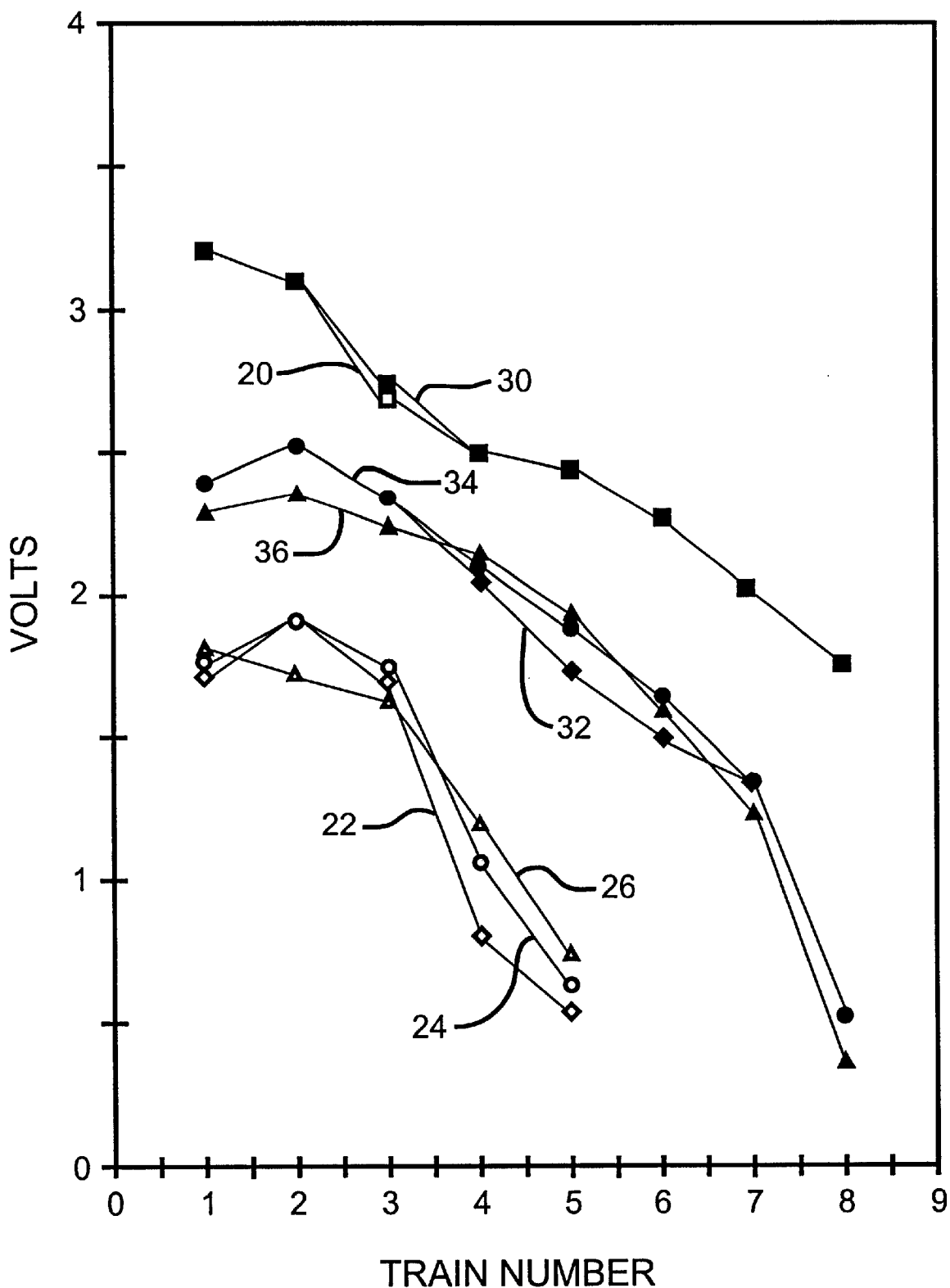
FIG. 2 is a graph constructed from the average pulse discharge readings of an unheated prior art Li/SVO cell in comparison to an annealed Li/SVO cell, wherein the cathode plates were made from free-standing sheets by calendaring a paste of an active admixture.

FIG. 2 is a graph constructed from the average pulse discharge readings of the control cells and the annealed cells. Specifically, curve 20 was constructed from the average open circuit voltage of the prior art cells in the example, curve 22 was constructed from the average p1 minimum, curve 24 from the average p1 end voltage and curve 26 from the average p4 minimum voltage during pulse discharge. The control discharge curves end at pulse train 5 because the pulse minima fell below the end-of-life cutoff. In contrast, curve 30 was constructed from the average open circuit voltage of the present invention cells in this example, curve 32 was constructed from the average p1 minima, curve 34 from the average p1 end voltage and curve 36 from the average p4 minima voltage during pulse discharge. The cells with the heat treated multiplate construction showed improved performance relative to the multiplate control cells in terms of pulse voltage minima.

Figure 3:
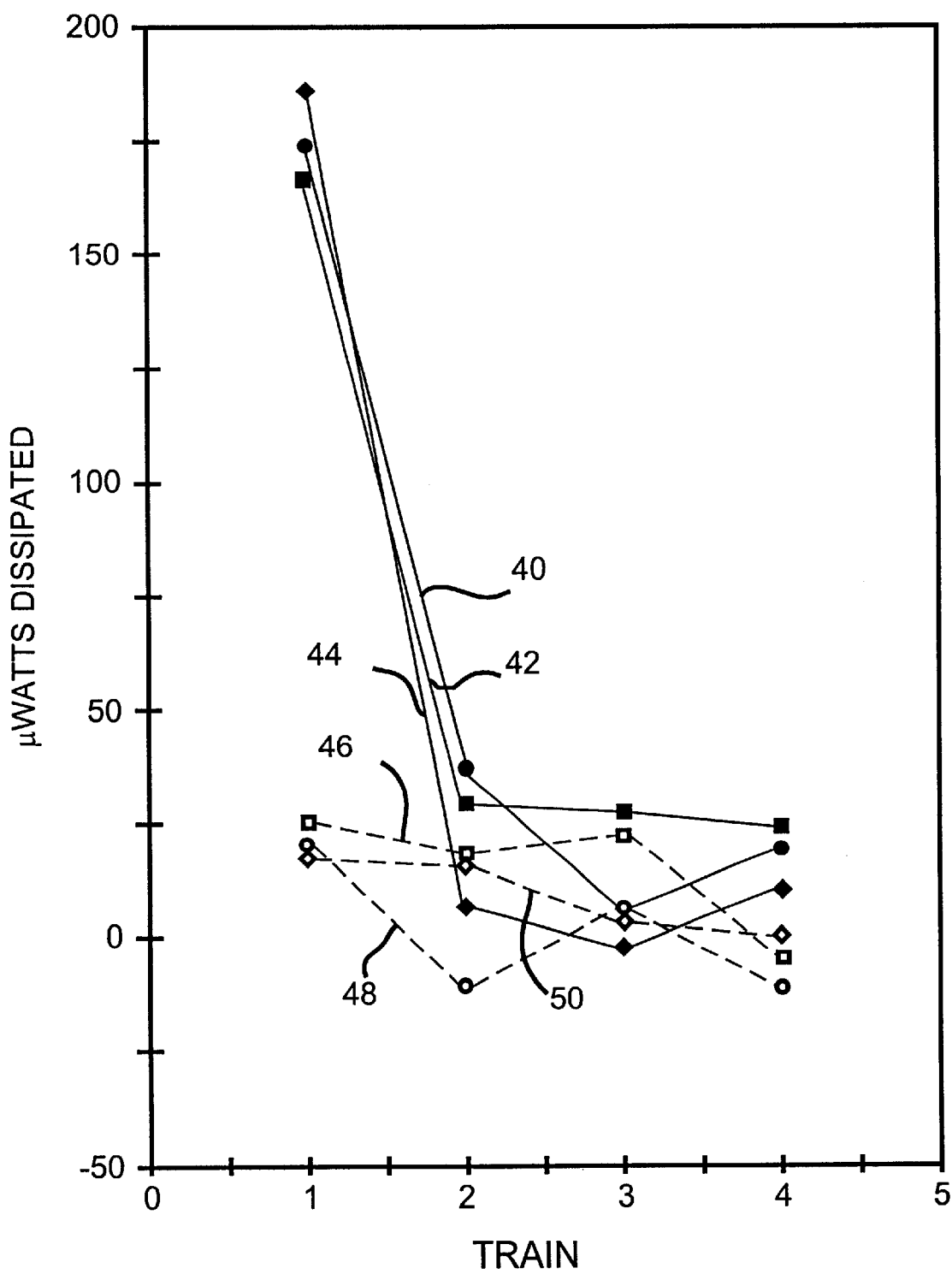
FIG. 3 is a graph constructed from heat dissipation readings versus depth of discharge for the cells discharged in FIG. 2.
Figure 3A:
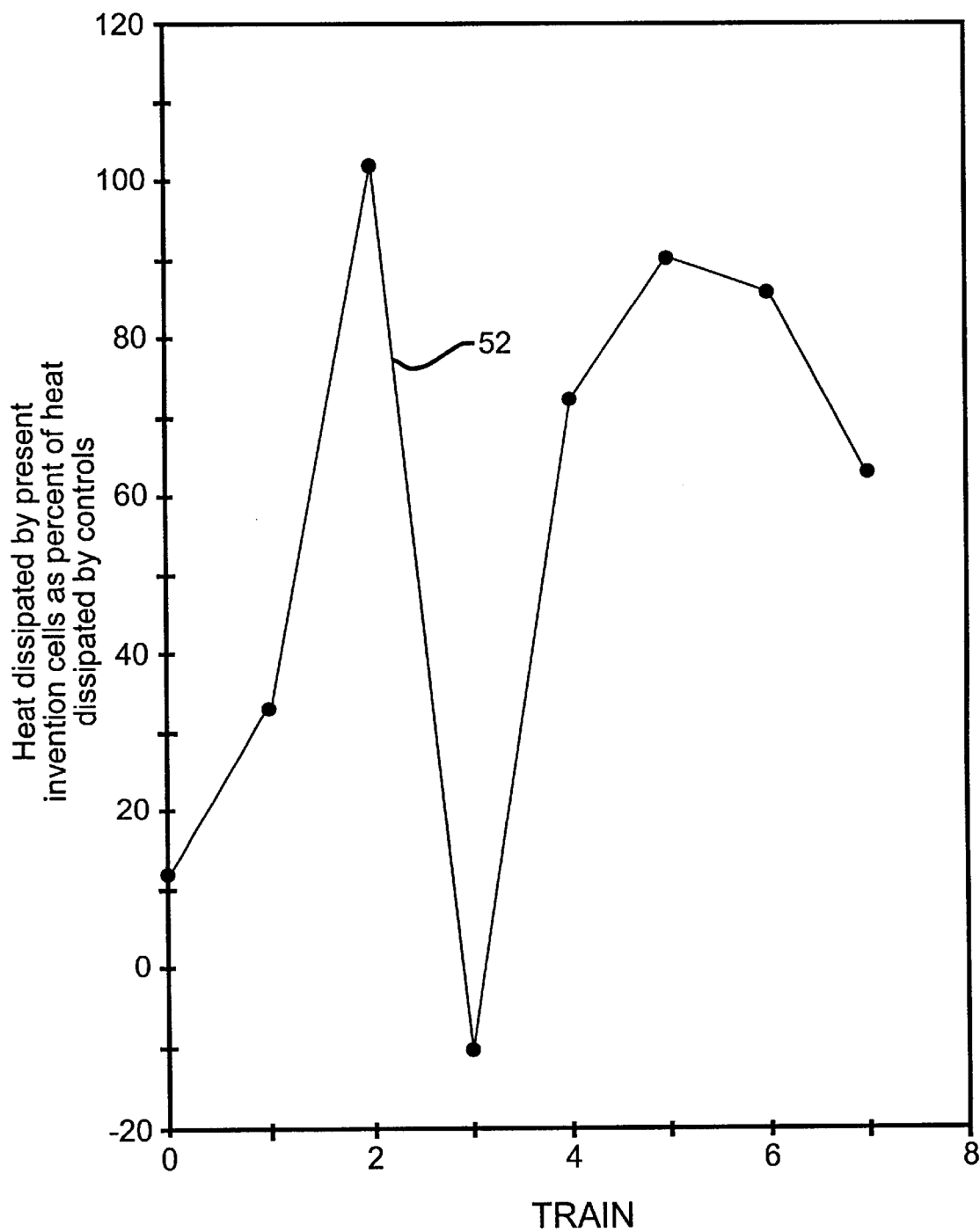
FIG. 3A is a graph of the average heat dissipated by the present invention cells as a percent of the average heat dissipated by the prior art cells.

Additionally, heat dissipation of the cells was measured prior to application of the pulse trains. A plot of heat dissipation versus depth of discharge is shown in FIG. 3, wherein curves 40, 42 and 44 were constructed from three prior art cells and curves 46, 48 and 50 were constructed from three present invention cells. FIG. 3A is a quantification of the data shown in FIG. 3 based on an average of three cells from each of the prior art group and the present invention group. Curve 52 is a plot of the average heat dissipated by the present invention cells as a percent of the average heat dissipated by the control cells. The cells with the heat treated cathodes dissipated much less heat at beginning of life than the control cells, an unexpected result.

EXAMPLE V

Ten Li/SVO cells were manufactured in a jellyroll configuration containing cathode sheets made in a manner similar to that described in Example III. Various ones of the cells had annealed cathode sheets and unheated cathode sheets. Specifically, cells made according to the present invention had cathodes sheets that were heat treated prior to winding into the jellyroll configuration.

The cells were then burned-in followed by discharge under an accelerated pulse discharge regime. Burn-in was accomplished via discharge under a 3.57 kΩ load for 15 hours followed by 7 days rest and application of one pulse train. The pulse train comprised four 10 second 1.3 A pulses with 15 seconds rest between each pulse. Accelerated pulse discharge consisted of applying one such train each 30 minutes. Burn-in and accelerated pulse summaries are provided in Tables 5 and 6, respectively.

Figure 4:
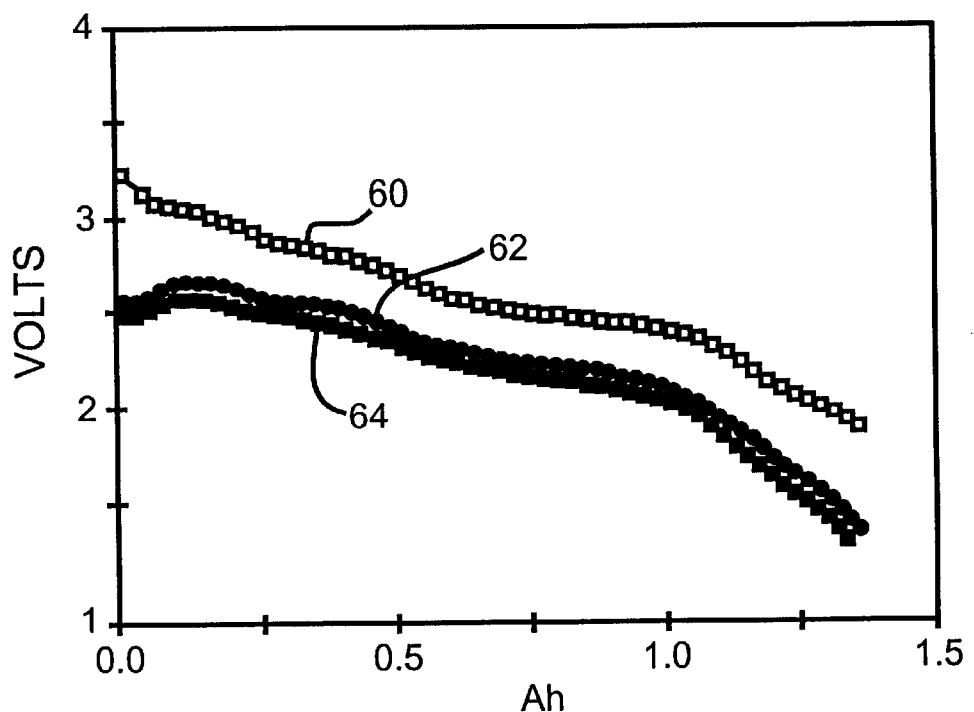
FIGS. 4 and 5 are graphs constructed from the accelerated pulse discharge data of a prior art and a present invention Li/SVO cell constructed in a jellyroll configuration.
Figure 5:
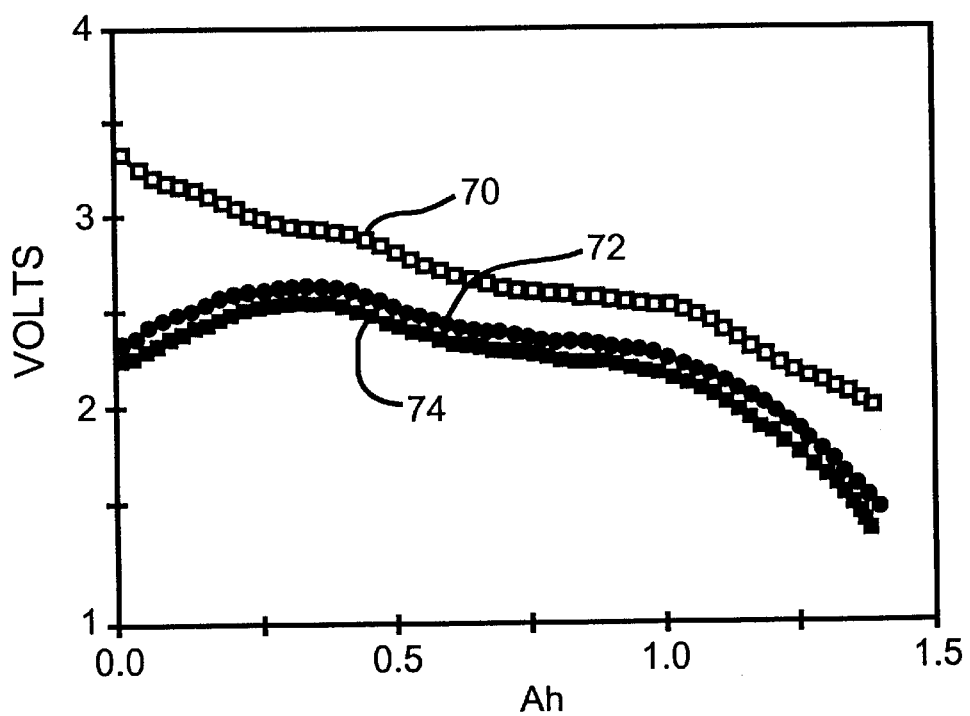

FIGS. 4 and 5 are graphs constructed from the burn-in and accelerated pulse discharge data of representative ones of the prior art and present invention cells. In particular, curve 60 was constructed from the prepulse voltage of one of the prior art cells, curve 62 was constructed from the p1 minima of that cell and curve 64 was constructed from the p4 minima. In contrast, curve 70 was constructed from the prepulse voltage of one of the present invention annealed cells, curve 72 was constructed from the p1 minima of that cell and curve 74 was constructed from the p4 minima.

The average discharge readings for the pre-pulse, p1 minimum, p1 end and p4 minimum potentials during burn-in and the delivered capacity to various voltage cut-offs during acceptance pulse testing are summarized in Tables 5 and 6, respectively.

TABLE 5

| Burn-in | | prepulse mV | p1 min mV | p1 end mV | p4 min mV |
|---|---|---|---|---|---|
| control cells | avg. | 3246 | 2526 | 2528 | 2501 |
| | std. dev. | 1 | 30 | 30 | 25 |
| annealed cells | avg. | 3254 | 1831 | 2147 | 2182 |
| | std. dev. | 1 | 130 | 130 | 108 |

TABLE 6

| Accelerated Pulse Test | | mAh to 2 V | mAh to 1.7 V | mAh to 1.5 V |
|---|---|---|---|---|
| control cells | avg. | 1018 | 1233 | 1305 |
| | std. dev. | 132 | 14 | 8 |
| annealed cells | avg. | 1102 | 1266 | 1330 |
| | std. dev. | 11 | 11 | 11 |

EXAMPLE VI

In order to determine if heat treating (annealing) the individual active and non-active components of a SVO depolarizer mixture prior to making the mixture would offer similar improvements to those shown in the above examples for completed and heat treated cathode plates fabricated into multiplate cells and cathode sheets fabricated into jellyroll cells, various combinations of annealed and unheated silver vanadium oxide and carbonaceous conductor depolarizer mixtures were tested. Specifically, four different depolarizer mixtures were provided including:

1) Heat treated SVO, heat treated Ketjenblack® carbon and heat treated graphite were mixed together.
2) Heat treated SVO and as-received Ketjenblack® carbon and as-received graphite were mixed together.
3) Heat treated Ketjenblack® carbon and as-made SVO and as-received graphite were mixed together.
4) Heat treated graphite and as-made SVO and as-received Ketjenblack® carbon were mixed together.

In all cases, the tested component was heated at about 225° C. for about 16 hours. A control group of cells was fabricated wherein none of the components was heat treated nor were the completed plates heat treated. Both multiplate and jellyroll cells were fabricated from the various combinations of annealed and unannealed active and non-active cathode components. The cells each had a lithium anode activated with an electrolyte of 1.0M $LiAsF_6$ in a 50:50 mixture of, by volume, propylene carbonate and 1,2-dimethoxyethane.

A constant resistance load of 3.57 kΩ was applied to all of the cells. For the multiplate cell design, the load was applied for 17 hours and for the jellyroll design, the load was applied for 15 hours during an initial predischarge burn-in period. The acceptance pulse train consisted of four 10 second pulses with a 15 second rest between each pulse. The cells were subjected to an acceptance pulse train one week after the constant resistance load was removed. For the multiplate cell design, the pulse amplitude was 1.74 A (23 $mA/cm^2$) and for the jellyroll design, the pulse amplitude was 1.30 A (23 $mA/cm^2$). One train was applied each 30 minutes. The respective burn-in and acceptance pulse tests for the multiple cell design are set forth in Tables 7 and 8 and for the jellyroll cell design are set forth in Tables 9 and 10.

Figure 6:
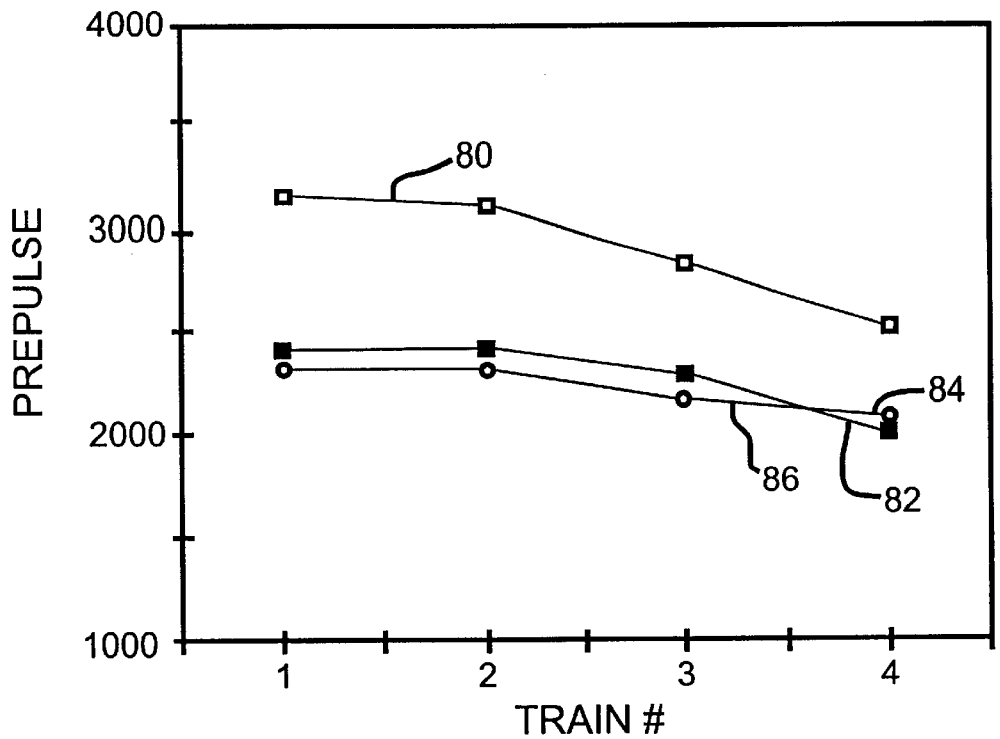
FIGS. 6 to 10 are graphs constructed from lithium cells having cathodes constructed from various active and non-active components of a SVO depolarizer heat treated prior to fabrication of cells.
Figure 7:
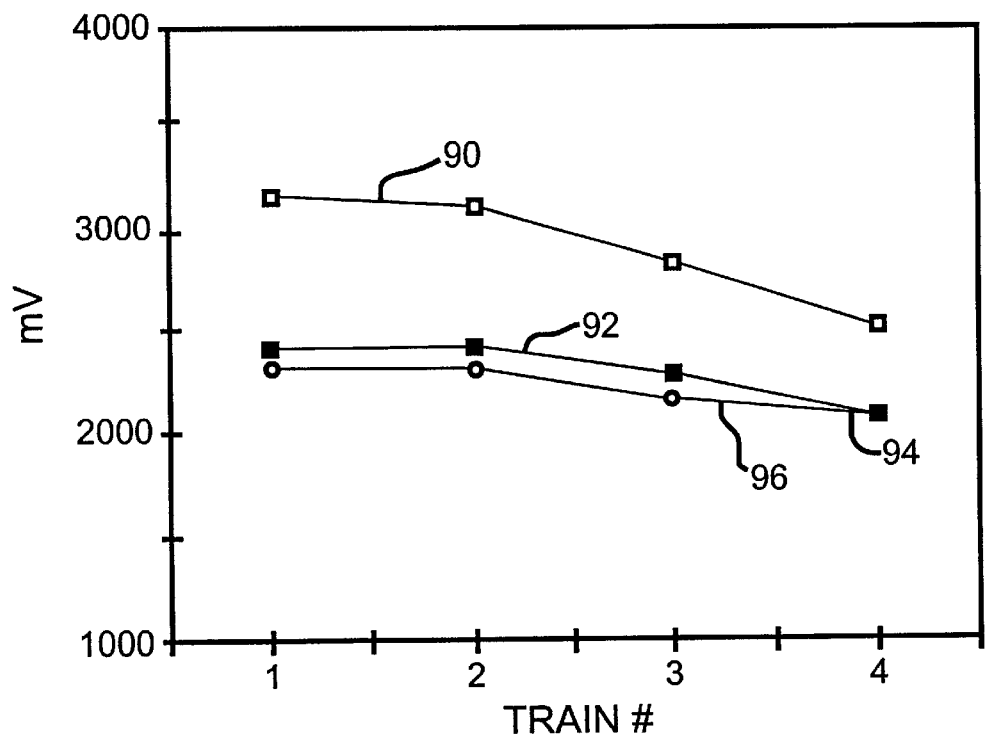
Figure 8:
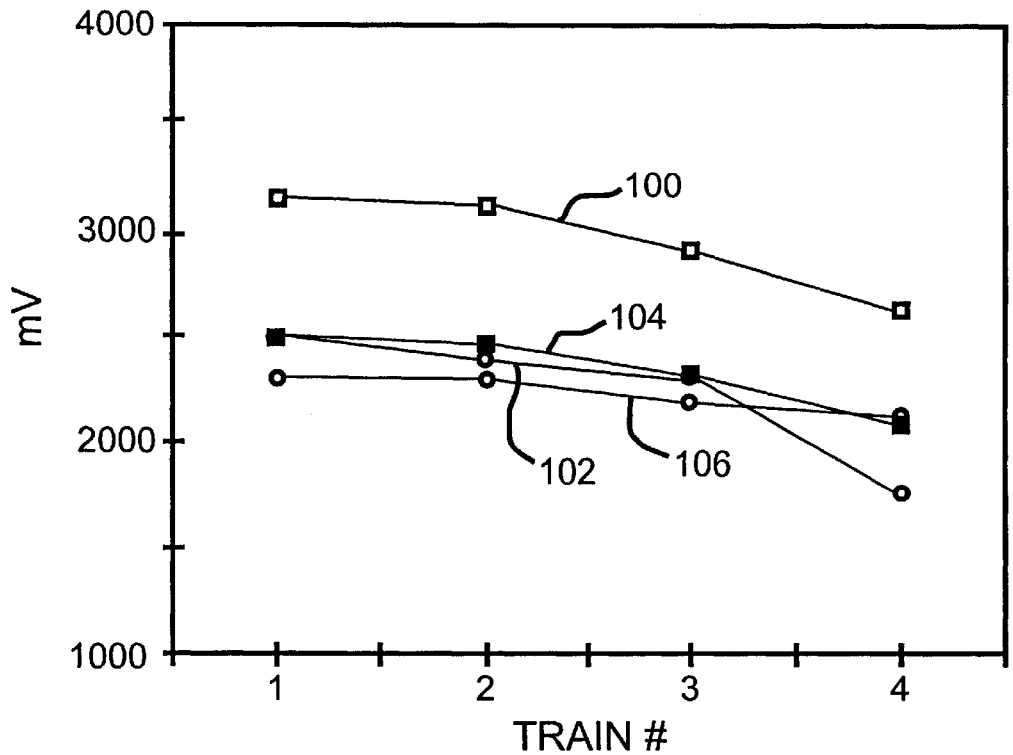
Figure 9:
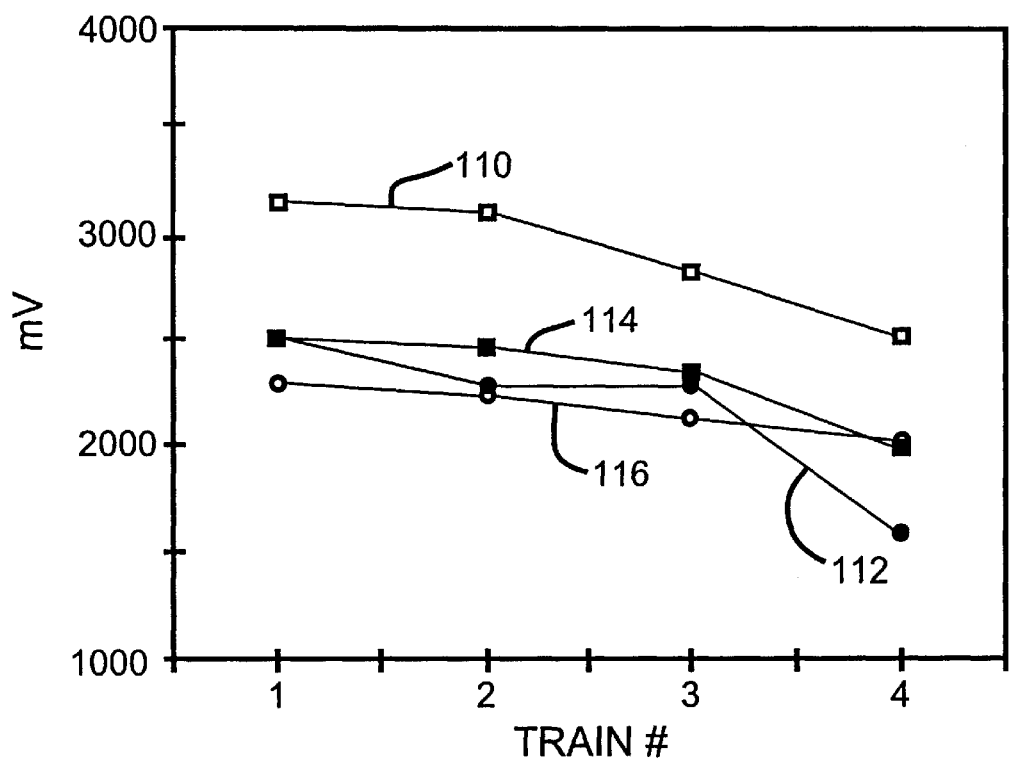
Figure 10:
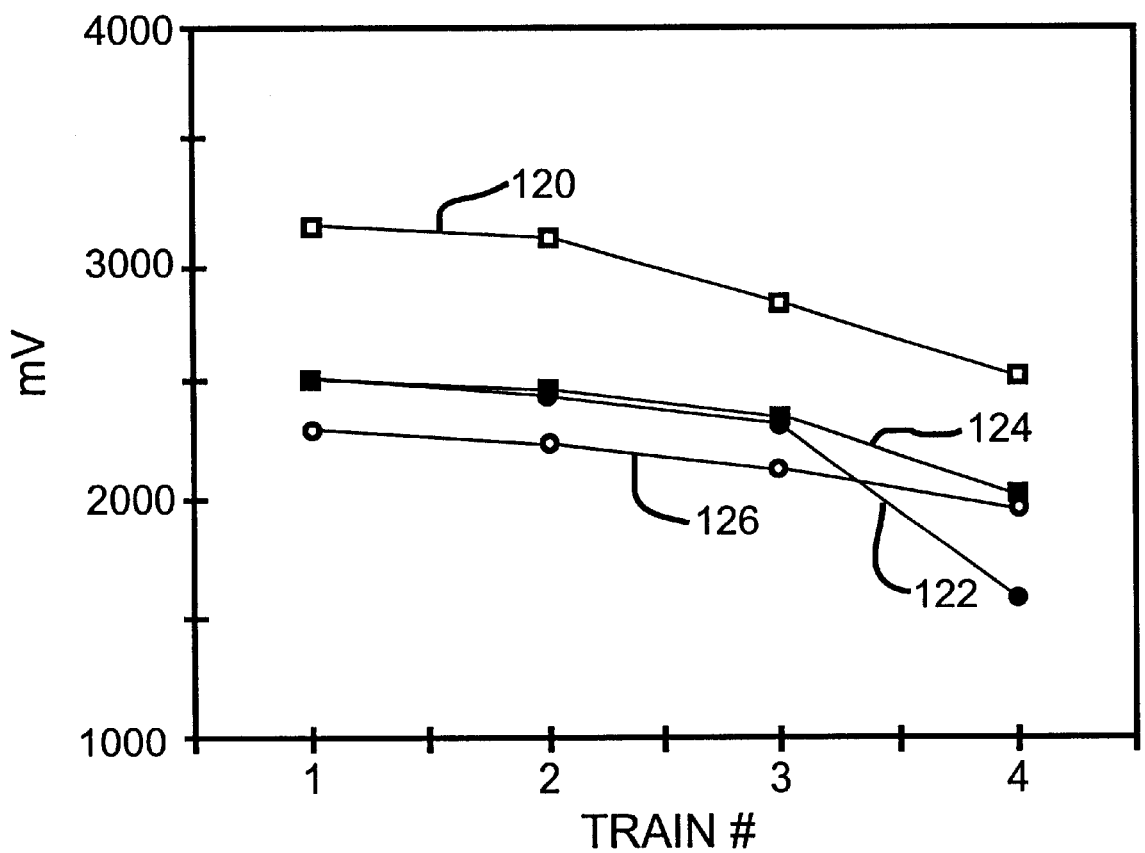

Furthermore, FIG. 6 was constructed from a representative one of the cells containing mixture 1) wherein curve 80 was constructed from the prepulse voltage and curves 82, 84 and 86 were constructed from the p1 min. voltage, p1 end voltage, and the p4 min. voltage, respectively. FIG. 7 was constructed from a representative one of the cells containing mixture 2) wherein curve 90 was constructed from the prepulse voltage and curves 92, 94 and 96 were constructed from the p1 min. voltage, p1 end voltage and the p4 min. voltage, respectively. FIG. 8 was constructed from a representative one of the cells containing mixture 3) wherein curve 100 was constructed from the prepulse voltage and curves 102, 104 and 106 were constructed from the p1 min. voltage, the p1 end voltage and the p4 min. voltage, respectively. FIG. 9 was constructed from a representative one of the cells containing mixture 4) wherein curve 110 was constructed from the prepulse voltage and curves 112, 114 and 116 were constructed from the p1 min. voltage, the p1 end voltage and the p4 min. voltage, respectively. FIG. 10 was constructed from a representative one of the control cells wherein curve 120 was constructed from the prepulse voltage and curves 122, 124 and 126 were constructed from the p1 min. voltage, the p1 end voltage, and the p4 min. voltage of that cell, respectively.

TABLE 7

| Burn-in | | prepulse (volts) | p1 min (volts) | p1 end (volts) | p4 min (volts) |
|---|---|---|---|---|---|
| control | avg. | 3.24 | 2.35 | 2.35 | 2.29 |
| | std. dev. | 0.00 | 0.18 | 0.18 | 0.20 |
| Ketjenblack ® | avg. | 3.25 | 2.39 | 2.39 | 2.33 |
| treated | std. dev. | 0.00 | 0.12 | 0.12 | 0.14 |
| graphite | avg. | 3.24 | 2.42 | 2.45 | 2.39 |
| treated | std. dev. | 0.00 | 0.03 | 0.02 | 0.02 |
| SVO | avg. | 3.25 | 2.36 | 2.39 | 2.35 |
| treated | std. dev. | 0.00 | 0.04 | 0.04 | 0.03 |
| all treated | avg. | 3.25 | 2.29 | 2.30 | 2.29 |
| | std. dev. | 0.00 | 0.02 | 0.03 | 0.02 |

TABLE 8

| Acceptance Pulse Test | | mAh to 2 V | mAh to 1.7 V | mAh to 1.5 V |
|---|---|---|---|---|
| control | avg. | 799 | 976 | 1078 |
| | std. dev. | 12 | 14 | 17 |
| Ketjenblack ® treated all cells | avg. | 684 | 863 | 960 |
| | std. dev. | 301 | 264 | 264 |
| Ketjenblack ® treated outlier gone | avg. | 834 | 995 | 1092 |
| | std. dev. | 5 | 6 | 6 |
| graphite treated | avg. | 852 | 1019 | 1116 |
| | std. dev. | 18 | 20 | 21 |
| SVO treated | avg. | 863 | 1020 | 1111 |
| | std. dev. | 13 | 12 | 12 |
| all treated | avg. | 830 | 993 | 1085 |
| | std. dev. | 19 | 14 | 13 |

TABLE 9

| Burn-in | | prepulse (volts) | p1 min (volts) | p1 end (volts) | p4 min (volts) |
|---|---|---|---|---|---|
| Ketjenblack ® | avg. | 3.26 | 2.53 | 2.53 | 2.51 |
| treated | std dev | 0.00 | 0.03 | 0.03 | 0.03 |
| graphite | avg. | 3.26 | 2.53 | 2.53 | 2.50 |
| treated | std dev | 0.00 | 0.04 | 0.04 | 0.04 |
| SVO treated | avg. | 3.26 | 2.53 | 2.53 | 2.51 |
| | std dev | 0.00 | 0.06 | 0.06 | 0.06 |
| all treated | avg. | 3.26 | 2.49 | 2.49 | 2.48 |
| | std dev | 0.00 | 0.06 | 0.06 | 0.05 |
| control | avg. | 3.26 | 2.57 | 2.57 | 2.54 |
| | std dev | 0.00 | 0.07 | 0.07 | 0.07 |

TABLE 10

| Acceptance Pulse Test | | mAh to 2 V | mAh to 1.7 V | mAh to 1.5 V |
|---|---|---|---|---|
| Ketjenblack ® treated | avg. | 933 | 1103 | 1173 |
| | std. dev. | 17 | 10 | 10 |
| graphite treated | avg. | 963 | 1132 | 1204 |
| | std. dev. | 13 | 15 | 15 |
| SVO treated | avg. | 945 | 1105 | 1169 |
| | std. dev. | 17 | 20 | 21 |
| all treated | avg. | 970 | 1133 | 1197 |
| | std. dev. | 10 | 12 | 12 |
| control | avg. | 944 | 1109 | 1176 |
| | std. dev. | 9 | 10 | 10 |

As shown in Tables 7 to 10, discharge performance improvement is not realized if any of the individual depolarizer components is heat treated prior to making a mix. These data support the necessity of heat treating the entire pressed cathode plate to provide discharge improvements according to the present invention. This is applicable to both multiplate and jellyroll electrode configurations.

EXAMPLE VII

In order to determine if forming the cathode structure from a free standing sheet according to the previously referenced U.S. Pat. No. 5,435,874 to Takeuchi et al. in comparison to a pressed powder technique resulted in significant differences in the discharge performance of the present invention cells, six multiplate cells containing the latter type of cathode plates were constructed. The plates were built from a dry granular admixture of, by weight, 94% svo active material, 3% PTFE binder material, 2% Ketjenblack® carbon and 1% graphite loaded into a hydraulic press. The admixture was pressed onto both sides of an intermediate screen to form the cathode plates. In all other respects, the cells were constructed in a similar manner as those described in Example II.

Three cells from both the annealed and the unheated plate groups were discharged at 37° C. The test comprised discharging the cells under a 15.5 kΩ load interrupted by a pulse train applied every 39 days. the pulse train consisted of four 10 second 1.74 A pulses (19 mA/cm$^2$) with 15 second rests between each pulse.

Figure 11:
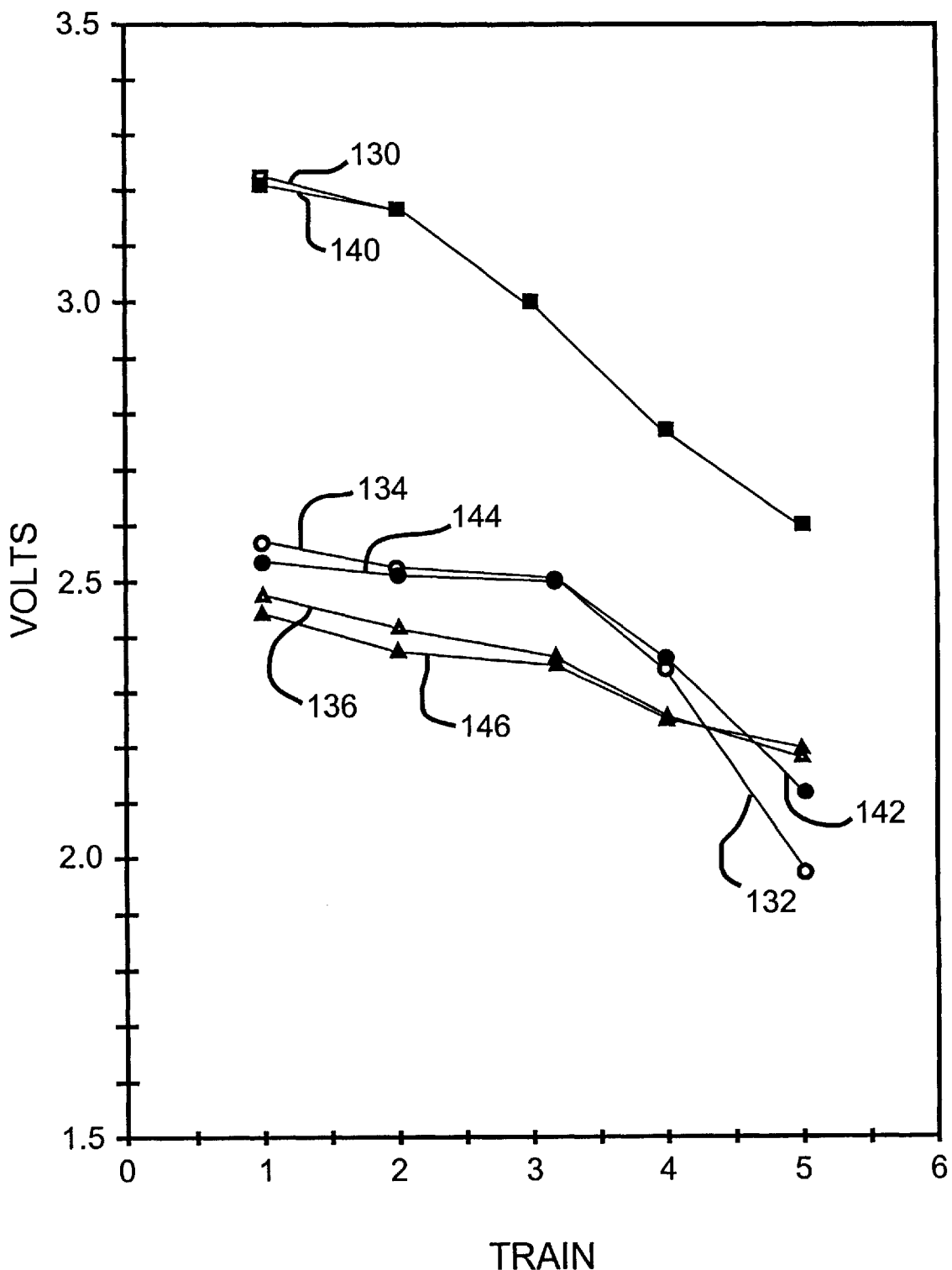
FIG. 11 is a graph constructed from representative annealed and unheated cells of a Li/SVO chemistry wherein the cathode plates were of a pressed powder construction.

FIG. 11 was constructed from the pertinent data collected during pulse discharge of the cells during pulse trains 1 to 5. Particularly, curve 130 was constructed from the prepulse voltage of a representative one of the unheated, control cells, and curves 132, 134 and 136 were constructed from the p1 min. voltage, the p1 end voltage and the p4 min. voltage, respectively, for pulse trains 1 to 5. In contrast, curve 140 was constructed from the prepulse voltage of a representative one of the annealed cells, and curves 142, 144 and 146 were constructed from the p1 min. voltage, the p1 end voltage and the p4 min. voltage, respectively, for pulse trains 1 to 5.

Improved discharge performance is again evident in the annealed protocol. Specifically, diminished voltage delay is realized in the fifth train of the cells having the heat treated pressed powder cathode fabricated into a multiplate design.

It is appreciated that various modifications to the inventive concepts described herein may be apparent to those skilled in the art without departing from the spirit and scope of the present invention as defined by the hereinafter appended claims.

What is claimed is:

1. An electrochemical cell comprising anode and cathode electrodes and an activating electrolyte, the improvement comprising;

the cell having a lithium-containing anode and a cathode, wherein the cathode contains an active material as a reaction product of at least a vanadium oxide salt and a salt of silver, the anode and the cathode exhibiting reduced polarization after having been contacted by the electrolyte, the reduced polarization being the result of the cathode comprising the active material contacted to a conductive current collector and thereafter heat treated at an elevated temperature prior to cell fabrication so that the cell is dischargeable with the cathode exhibiting a resistivity of less than about 0.2 Ωcm.

2. The electrochemical cell of claim 1 wherein the elevated temperature is at least about 225° C. for at least about 8 hours.

3. The electrochemical cell of claim 1 wherein the cathode is characterized as having been heat treated at the elevated temperature ranging from about 225° C. to about 300° C.

4. The electrochemical cell of claim 1 wherein the cathode is characterized as having been heat treated at the elevated temperature for a heating time of about 8 hours to about 16 hours.

5. The electrochemical cell of claim 1 wherein the electrolyte has dissolved therein a lithium salt.

6. An electrode, which comprises:
   a) an active material comprising a reaction product of at least a vanadium oxide and a salt of silver; and
   b) a conductive current collector contacted with the active material to provide the electrode, wherein the electrode is characterized as having been heat treated at an elevated temperature of at least about 225° C. for at least about 8 hours to provide the electrode having a resistivity of less than about 0.2 Ωcm.

7. The electrode of claim 6 wherein the electrode is characterized as having been heat treated at the elevated temperature ranging from about 225° C. to about 300° C.

8. The electrode of claim 6 wherein the electrode is characterized as having been heat treated at the elevated temperature for a heating time of about 8 hours to about 16 hours.

9. The electrode of claim 6 wherein the current collector is selected from the group consisting of titanium, stainless steel, nickel, molybdenum, tantalum, niobium, cobalt, tungsten, platinum, palladium, gold, silver, copper, chromium, vanadium, aluminum, zirconium, hafnium, zinc, iron, and mixtures and alloys thereof.

10. The electrode of claim 6 wherein the active material is selected from the group consisting of silver vanadium oxide, copper silver vanadium oxide, and mixtures thereof.

11. A method for constructing an electrochemical cell comprising the steps of:
    a) providing an anode;
    b) providing a cathode of an active material contacted to a conductive current collector, wherein the active material a reaction product of at least a vanadium salt and a salt of silver;
    c) heating the cathode to a temperature of at least about 225° C. to reduce resistivity of the cathode to less than about 0.2 Ωcm; and
    d) activating the anode and cathode with an electrolyte.

12. The method of claim 11 including heating the cathode to at least about 225° C. for at least about 8 hours.

13. The method of claim 11 including heating the cathode from about 225° C. to about 300° C.

14. The method of claim 11 including heating the cathode for a heating time of about 8 hours to about 16 hours.

15. The method of claim 11 including selecting the active material from the group consisting of silver vanadium oxide, copper silver vanadium oxide, and mixtures thereof.

16. The method of claim 11 including selecting the current collector from the group consisting of titanium, stainless steel, nickel, molybdenum, tantalum, niobium, cobalt, tungsten, platinum, palladium, gold, silver, copper, chromium, vanadium, aluminum, zirconium, hafnium, zinc, iron, and mixtures and alloys thereof.

17. The method of claim 11 including providing the cathode comprised of silver vanadium oxide contacted to a titanium current collector and then heating the cathode at an elevated temperature ranging from about 225° C. to about 250° C. for a time of about 8 hours to about 16 hours.

18. The method of claim 11 including mixing the active material with a binder material prior to contact with the current collector, wherein the binder is selected from the group consisting of polytetrafluoroethylene, polyvinylidene fluoride, polyethylenetetrafluoroethylene, polyamides, polyimides, and mixtures thereof.

19. The method of claim 11 including mixing the active material with a conductive additive prior to contact with the current collector, wherein the conductive additive is selected from the group consisting of carbon, graphite powder, acetylene black, titanium powder, aluminum powder, nickel powder, stainless steel powder, and mixtures thereof.

20. A method for constructing an electrochemical cell, comprising the steps of:
    a) providing an anode;
    b) providing a cathode of an active material contacting a conductive current collector, wherein the active material is a reaction product of at least a vanadium salt and a salt of silver;
    c) heating the cathode to a temperature ranging from about 225° C. to about 300° C. to reduce resistivity of the cathode to less than about 0.2 Ωcm; and
    d) activating the anode and cathode with an electrolyte.

21. A method for constructing an electrochemical cell, comprising the steps of:
    a) providing an anode;
    b) providing a cathode of an active material contacting a conductive current collector, wherein the active material is a reaction product of at least a vanadium salt and a salt of silver;
    c) hearing the cathode for about 8 hours to about 16 hours to reduce resistivity of the cathode to less than about 0.2 Ωcm; and
    d) activating the anode and cathode with an electrolyte.

22. A method for constructing an electrochemical cell, comprising the steps of:
    a) providing an anode;
    b) providing a cathode of silver vanadium oxide contacted to a titanium current collector;
    c) heating the cathode to a temperature ranging from about 225° C. to about 250° C. for about 8 hours to about 16 hours to reduce resistivity of the cathode to less than about 0.2 Ωcm; and
    d) activating the anode and cathode with an electrolyte.

* * * * *

UNITED STATES PATENT AND TRADEMARK OFFICE
CERTIFICATE OF CORRECTION

PATENT NO. : 6,228,534 B1
DATED : May 8, 2001
INVENTOR(S) : Takeuchi et al.

It is certified that error appears in the above-identified patent and that said Letters Patent is hereby corrected as shown below:

Column 13,
Lines 32-33, after "material", insert -- is --.

Column 14,
Line 36, "hearing" should be -- heating --.

Signed and Sealed this

Twenty-seventh Day of November, 2001

Attest:

*Nicholas P. Godici*

NICHOLAS P. GODICI
*Attesting Officer*  *Acting Director of the United States Patent and Trademark Office*